United States Patent [19]

Tesar

[11] Patent Number: 4,993,670
[45] Date of Patent: Feb. 19, 1991

[54] UNIVERSAL BRACKET ASSEMBLY

[75] Inventor: Robert D. Tesar, Independence, Ohio

[73] Assignee: Perfection Corporation, Madison, Ohio

[21] Appl. No.: 640,963

[22] Filed: Aug. 15, 1984

[51] Int. Cl.$^5$ .............................................. F16L 3/00
[52] U.S. Cl. .................................... 248/68.1; 248/70; 248/74.1; 248/909; 248/911
[58] Field of Search ................... 248/544, 548, 57, 62, 248/65, 67.7, 68.1, 70, 74.1, 74.4, 258, DIG. 9, 230, 300, DIG. 11, 915, 916

[56] References Cited

U.S. PATENT DOCUMENTS

| 796,178 | 8/1905 | Beaton | 248/57 |
|---|---|---|---|
| 1,050,235 | 1/1913 | Scanlan | 348/74.1 |
| 1,429,776 | 9/1922 | Robinson | 248/300 |
| 1,995,370 | 3/1935 | Walters | 248/68.1 |
| 2,316,389 | 4/1943 | Atkinson | 248/300 |
| 2,886,269 | 5/1959 | Carlson | 248/70 |
| 2,975,998 | 3/1961 | Clift | 248/68.1 |
| 3,285,552 | 11/1966 | Becker | 248/68.1 |
| 3,385,545 | 5/1968 | Patton | 248/230 |
| 3,599,921 | 8/1971 | Cumber | 248/DIG. 9 |
| 3,606,217 | 9/1971 | Leiferman | 248/57 |
| 3,691,839 | 9/1972 | Lasher . | |
| 3,746,371 | 7/1973 | Leopold et al. . | |
| 3,897,926 | 8/1975 | Silver | 248/916 |
| 3,944,175 | 3/1976 | Kearney | 248/68.1 |
| 3,999,663 | 12/1976 | Walter | 248/DIG. 9 |
| 4,033,531 | 7/1977 | Levine | 248/558 |
| 4,254,930 | 3/1981 | Warren . | |
| 4,307,865 | 12/1981 | MacCready | 248/558 |
| 4,356,986 | 11/1982 | Lynch | 248/57 |

FOREIGN PATENT DOCUMENTS 3047973 10/1981 Fed. Rep. of Germany ........ 248/70

Primary Examiner—Ramon O. Ramirez
Assistant Examiner—Robert A. Olson
Attorney, Agent, or Firm—Fay, Sharpe, Beall, Fagan, Minnich & McKee

[57] ABSTRACT

A universal bracket assembly for gas risers includes first and second L-shaped members with each member having a main body portion and a flange extending from one end of the main body portion. A first aperture is provided in the L-shaped member, in each flange, through which a first fastener can extend. A second aperture is provided in the L-shaped member, in each of the main body portions, through which a second fastener can extend to secure the main body portions to each other. The first and second L-shaped members can be secured to each other in different ways to create several different structures whereby different numbers of gas risers can be supported. The bracket assembly can also be secured to varying types of support structures.

15 Claims, 3 Drawing Sheets

UNIVERSAL BRACKET ASSEMBLY

BACKGROUND OF THE INVENTION

This invention relates generally to bracket assemblies. More specifically, the present invention relates to a universal bracket assembly having bracket members which can be secured to each other in different ways to create several different structures. Although the invention will be described with particular reference to a bracket assembly for gas risers, it will be recognized that certain features thereof may be used or adapted for use for brackets supporting other objects.

Natural gas is transmitted to homes and business establishments by means of underground service lines or pipes which extend from centrally located gas mains. A service pipe normally extends from a gas main to a location approximately in alignment with an above ground gas meter. Transmission of the gas from the underground service line to the gas meter is accomplished by a riser which is generally L-shaped. The upper end of the riser is interconnected with the meter to measure how much gas is consumed. Gas meters are generally either attached to the wall of a building or are free-standing.

In order to provide support for the gas riser at a building, it is customary today to employ a riser bracket. Such a bracket is normally attached to the foundation of a building and provides support to the riser to keep it from pulling away from the meter should, for example, the ground adjacent the foundation of the building settle as may happen in the case of new construction.

When the gas meter is free-standing, as when it is positioned away from a building, an underground service line is connected to the meter by a first riser with a second riser extending from the meter back into the ground to a portion of the service line which leads to the building. In this case, a different type of bracket assembly is necessary to support both of the risers from a post or the like.

Under some circumstances, it may not be feasible or desirable to secure the bracket to the foundation of a building even when it is adjacent thereto. In such an instance, a different type of bracket may be required to support one gas riser from a free-standing structure adjacent the building foundation.

It would be useful, however, if one bracket assembly could be made "universal", i.e., be designed to support all types of gas riser structures. It is evident that if one bracket assembly could be used for all types of gas riser support purposes, it would be beneficial with regards to reducing the number of types of bracket assemblies which conventionally need to be kept in inventory.

It has, therefore, been considered desirable to develop a new and improved universal bracket assembly having a structure which would overcome the foregoing difficulties and others while providing better and more advantageous overall results.

BRIEF SUMMARY OF THE INVENTION

A bracket assembly according to the present invention has a first L-shaped member and a second L-shaped member. The two members each have main body portions and flanges extending from one end of the main body portion. At least a part of each of the two main body portions contact each other to create the bracket assembly. A first aperture is provided in the members, in each flange portion, through which a first fastener can extend with a second aperture being provided in the members, in each main body portion, through which a second fastener can extend. The first and second L-shaped members can be secured to each other in various different ways so that different numbers of gas risers can be supported and so that the bracket assembly can be secured to varying types of support structures.

The principal focus of the present invention is the provision of an improved bracket assembly.

One advantage of the invention is the provision of a universal bracket assembly which can be configured for use for all known types of gas riser structures.

Another advantage of the invention is the provision of a bracket assembly which can be easily shortened to adapt the assembly for use in confined spaces.

Still other advantages of the invention will become apparent to those skilled in the art upon a reading and understanding of the following detailed description.

BRIEF DESCRIPTION OF THE DRAWINGS

The invention may take form in certain parts and arrangements of parts, the preferred embodiments of which will be described in detail in the specification and wherein.

DETAILED DESCRIPTION OF THE PREFERRED EMBODIMENT

Figure 1:
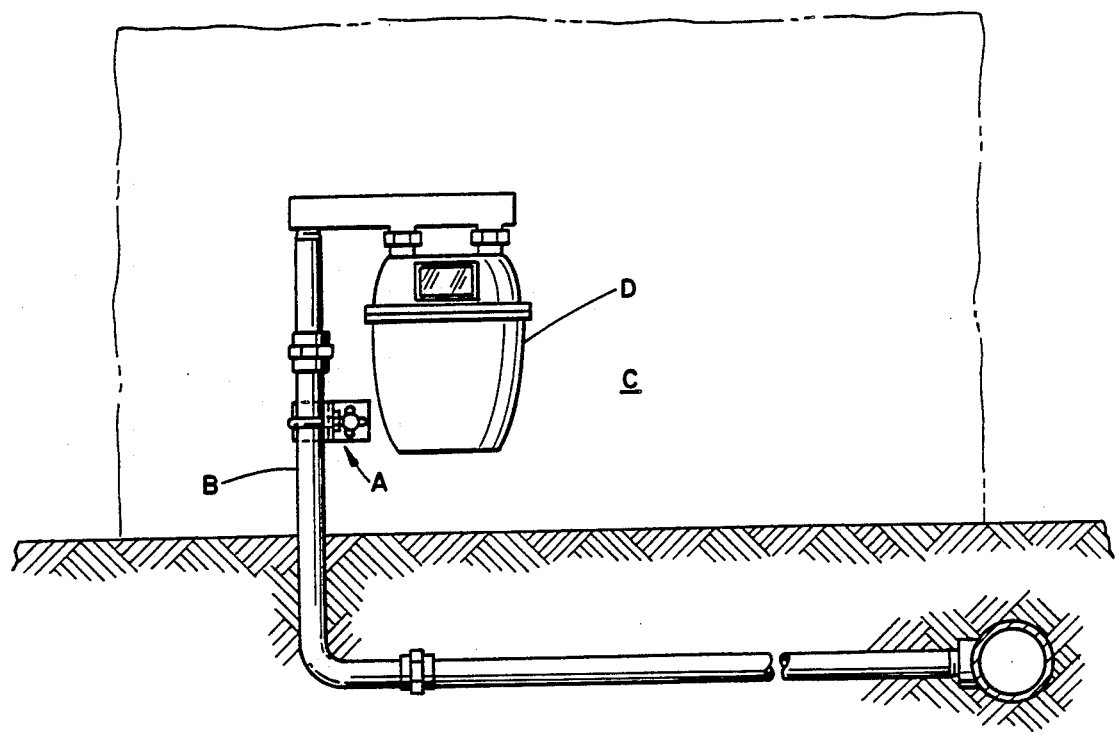
FIG. 1 is a side elevational view of a first type of gas riser structure.

With reference to the drawings, wherein the showings are for purposes of illustrating a preferred embodiment of the invention only and not for purposes of limiting same, FIG. 1 shows a first type of gas riser structure in which a bracket assembly A secures a gas riser B to a building wall C. A gas meter D is provided at the top of the gas riser B to measure the amount of gas consumed. The gas is transmitted from the meter into the building by a pipe not visible in FIG. 1.

Figure 2:
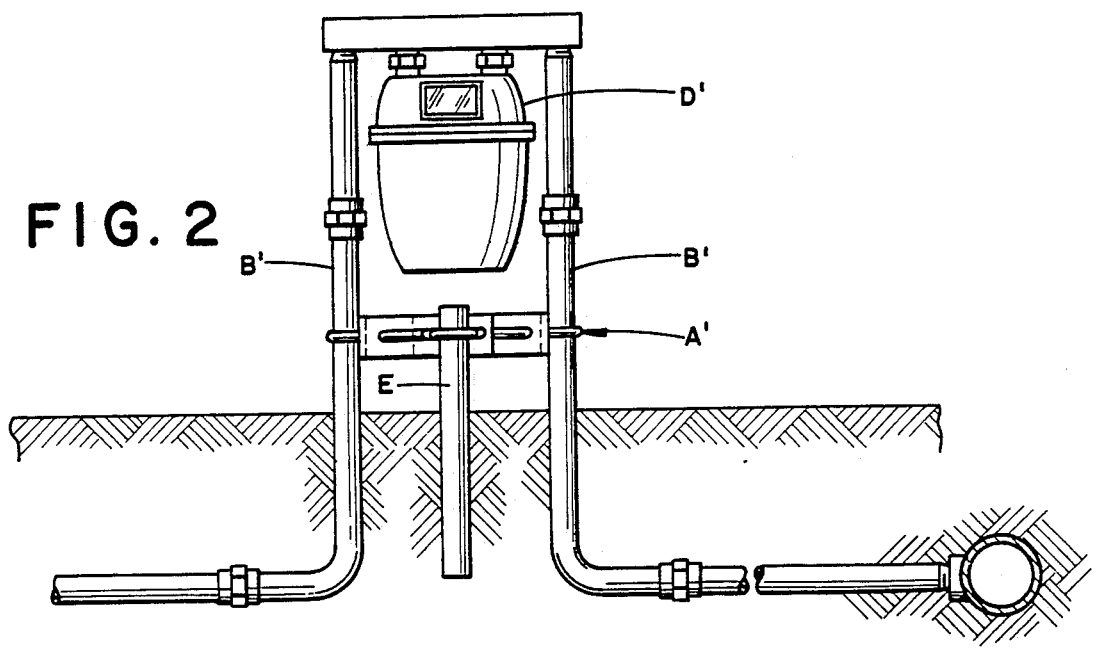
FIG. 2 is a side elevational view of a second type of gas riser structure.

With reference now to FIG. 2, another type of gas riser structure is employed in a situation where the gas meter is positioned at a distance from the building which is supplied by gas. In this situation, two gas riser pipes B', B' and a meter D' positioned therebetween are secured by another type of bracket assembly A' to a stake-like support member E. Thus, the stake E supports both riser pipes B', B' and, to some degree, the meter D'.

Figure 3:
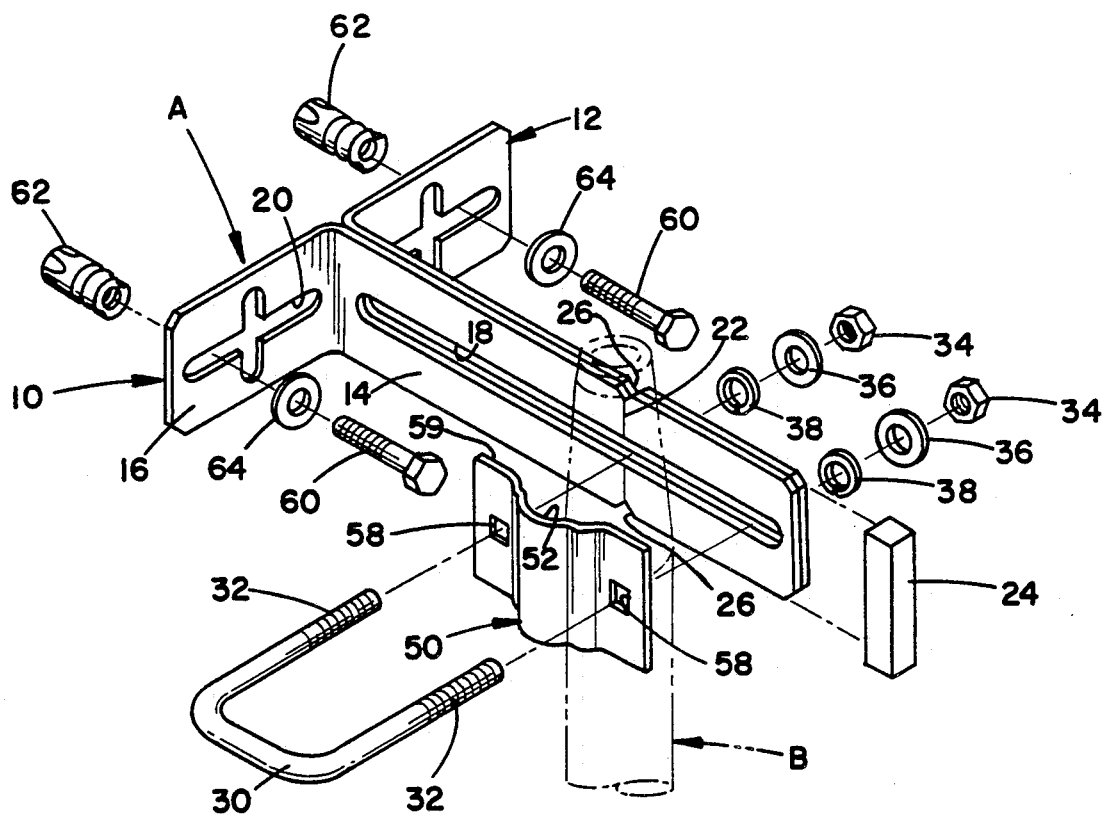
FIG. 3 is a perspective view of a first type of bracket assembly structure which can be made from the universal bracket assembly of the present invention and which is usable with the gas riser structure of FIG. 1.

With reference now to FIG. 3, the first type of gas riser bracket structure A, which can be formed from the universal bracket assembly of the present invention, and which is meant to support a gas riser as shown in FIG. 1, includes a first L-shaped bracket element or member 10 and a second L-shaped member 12. These members 10, 12 are put together back-to-back to form a T-shaped bracket structure. Since both L-shaped members 10, 12 have identical components, only the first L-shaped member 10 will be described in detail it being understood that the second one 12 has identical components.

The L-shaped member 10 has a first leg 14 and a second leg or flange 16 which extends approximately transversely to the first leg. An elongated linear aperture 18 is provided in the first leg 14 while a cruciform shaped aperture 20 is preferably provided in the second leg 16. Of course, it should be recognized that these apertures 18, 20 may have other configurations as may be required by the type of fastener extending therethrough.

One or more weakening lines 22 may be provided on the first leg 14 of each of the bracket members 10, 12 to enable the bracket structure to be shortened in a situation where the bracket assembly A is to be used in confined spaces. If the bracket structure is shortened, by breaking the member 10 along one of the weakening lines 22, a cap member 24 may be used in order to prevent injury by the sharp edge which is produced. This cap member 24 can be positioned over the sharp cut edge of the first leg 14 of each bracket member 10, 12.

The bracket components 10, 12 may be shortened by laying the first legs 14 on a flat surface with one of the weakening lines or scored lines 22 over an unsupported area. With the palm of the hand, one can push down on the free end of the bracket first leg 14 while holding the rest of the leg in place with the other hand. In order to aid this breaking operation a V-shaped notch 26 may be provided at each end of the scored line 22.

Figure 4:
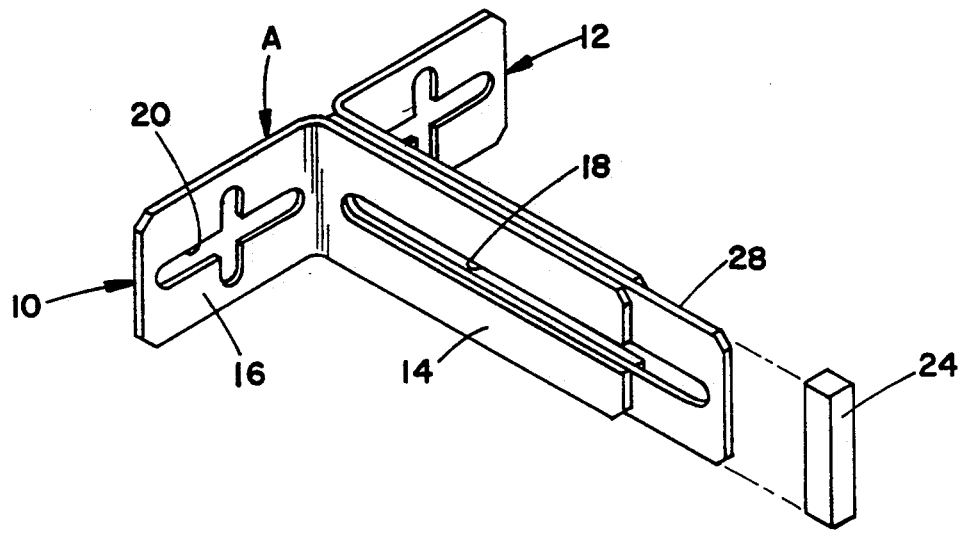
FIG. 4 is a perspective view of the first type of bracket assembly structure of FIG. 3 using an additional component.

If the end pieces are broken off the bracket components 10, 12, they may, of course, be discarded. Alternatively, with reference now to FIG. 4, one of the end pieces 28 can be saved and inserted between the two bracket components 10, 12 before the cap member 24 is secured thereto. Such an end piece 28 provides a closed end for the slots 18 in the bracket first legs 14. It also adds somewhat more rigidity to the structure.

With reference again to FIG. 3, a first fastener 30 may extend through the elongated aperture 18 of each of the two bracket components 10, 12 to support the gas riser B as shown in FIG. 1. The first fastener 30 may be a U-shaped bolt with either a round bottom or a square bottom and preferably has threaded ends 32 upon which can be threaded a pair of nuts 34.

A support retainer 50 can be positioned between the first fastener 30 and the gas riser pipe B to enable riser pipes of various diameters ranging from three-quarters of an inch to two inches to be supported by the first fastener 30. The retainer 50 has an indented central portion 52 which appears somewhat scalloped in cross section. This scalloping enables the retainer 50 to have support surfaces for different diameters of pipes thereby enabling pipes of various diameters to be supported. At least two differently radiused sets of support surfaces 54, 56 are provided on the retainer as can be better seen from FIG. 6. It is, of course, evident that more such support surfaces may also be provided, if desired. A pair of apertures 58 are provided in the retainer to enable the two legs of the fastener 30 to extend therethrough.

If desired, metal washers 36 and fabric washers 38 may be positioned between the nuts 34 and a rear surface 59 of the support retainer 50.

The cruciform aperture 20 in the bracket components 10, 12 also has fasteners 60 extending therethrough. In the embodiment of FIG. 3, the fasteners 60 are bolts which cooperate with lead anchors 62 secured in the building foundation to hold the bracket assembly to the foundation. A washer 64 may be positioned between each fastener 60 and its respective anchor 62. These fasteners may, however, also take the form of rivets or screws to secure the T-shaped bracket structure to a building wall. In other words, any conventional fastener will suffice for this purpose. One advantage of the cruciform apertures 20 is that they enable the fasteners 60 to be positioned along either slot of the cruciform aperture.

Figure 5:
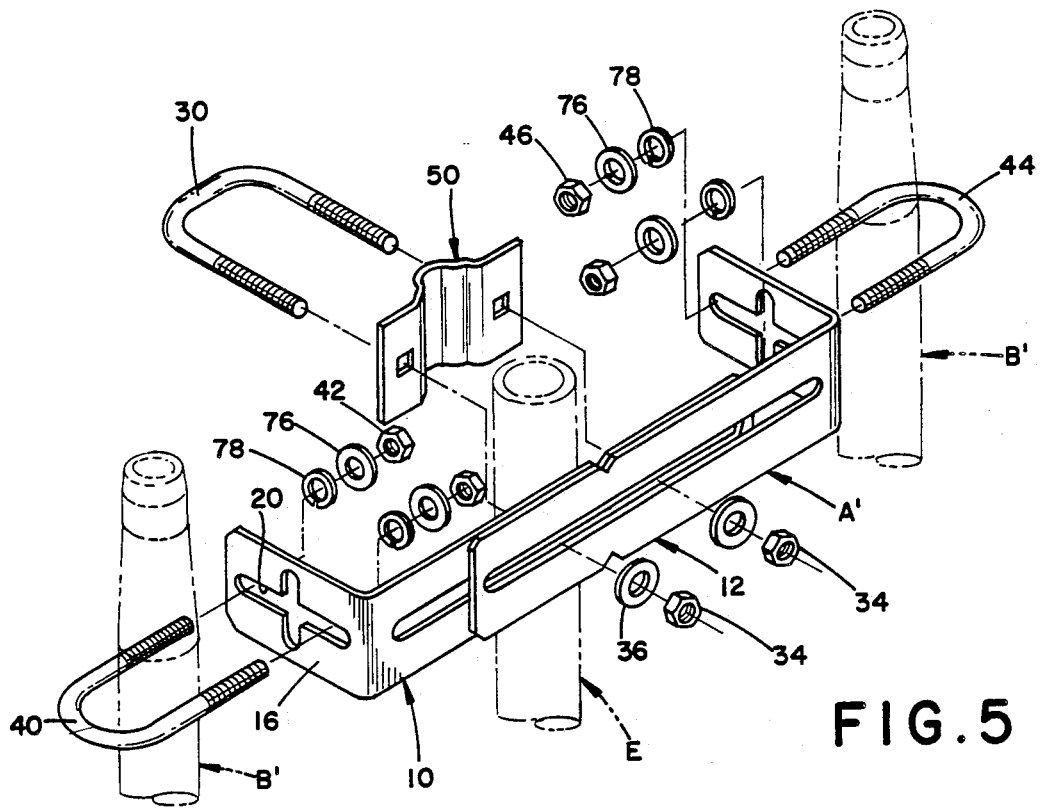
FIG. 5 is a perspective view of a second type of bracket assembly structure which can be made from the universal bracket assembly of the present invention and which is usable with the gas riser structure of FIG. 2; and, FIG. 6 is an exploded perspective view of a third type of bracket assembly structure which can be made from the universal bracket assembly of the present invention and which is usable with a free-standing single gas riser structure.

With reference now to FIG. 5, a second type of bracket structure A', which can be formed from the universal bracket assembly of the present invention, is necessary for supporting the two gas risers B' illustrated in FIG. 2. In this situation, the two bracket components 10, 12 are arranged in a U-shaped configuration with the first fastener 30 being clamped around the support retainer 50 which, in turn, is secured to the stake-like supporting member E. The member E may be a one and one-quarter inch steel pipe post or a similar support. A second fastener 40 extends through the cruciform aperture 20 of the first component 10 to support a first gas riser pipe B' with a third fastener 44 extending through a cruciform aperture 20 which is provided in the second bracket component 12 to support a second gas riser pipe B'.

As was true with the first fastener 30, the second and third fasteners 40, 44 are preferably U-shaped and have threaded ends on which can be secured respective nuts 42, 46. The second and third fasteners are clamped around the two gas risers B', B' of the gas riser assembly illustrated in FIG. 2. If desired, metal washers 76 and fabric washers 78 may be positioned between the nuts 42, 46 and the flanges 16 of the bracket components 10, 12. In the embodiment of FIG. 5, only the metal washers 36 are positioned between the nuts 34 and the second bracket component 12, but this is a matter of choice and fabric washers could also be provided.

It should be noted that the cruciform shape of the aperture 20 in the first and second bracket components 10, 12 serves the dual function of supporting higher a U-shaped fastener 40, 44 (for the two riser structure of FIG. 2) or a fastening bolt or other type of single stem fastener 60 (for the one riser structure of FIG. 1).

Figure 6:
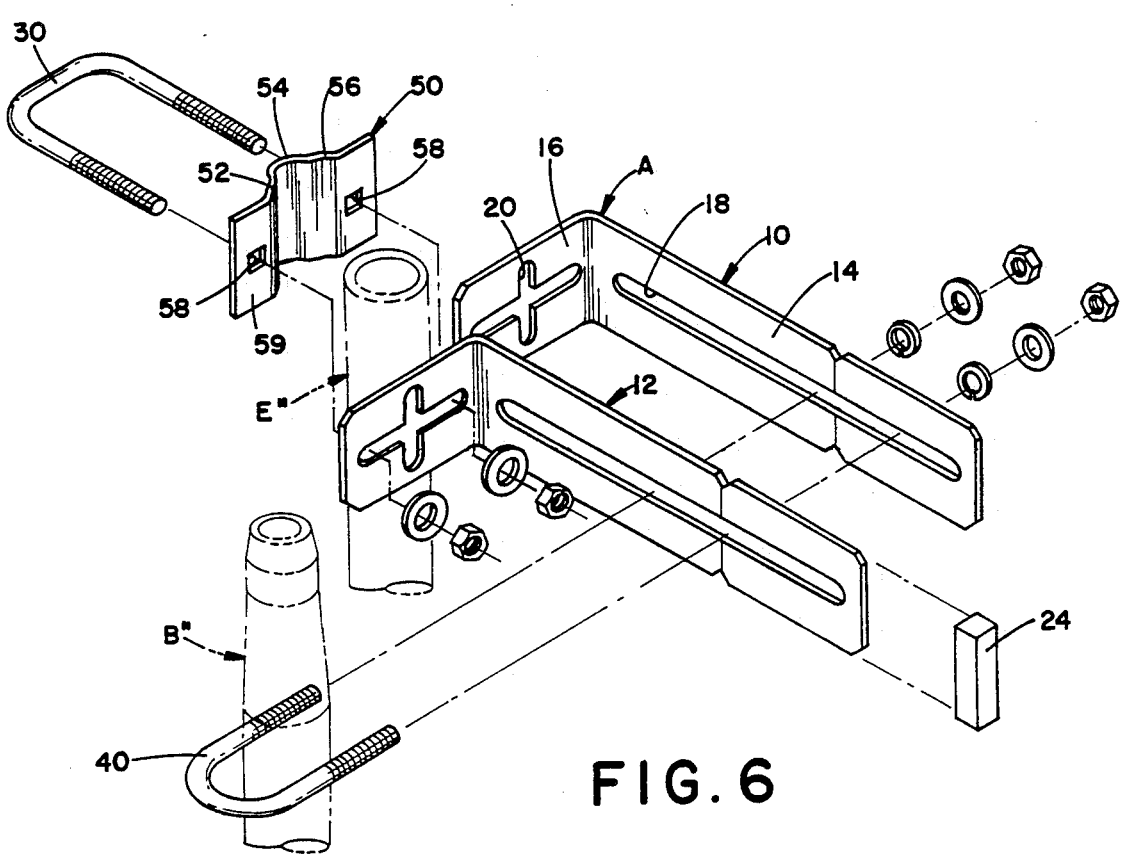

In the embodiment of FIG. 6, a third type of bracket structure A" has the two bracket elements 10, 12 nested so that there is full surface contact of the two elements along both their first and second legs 14, 16. The second fastener 40 can be used to secure a gas riser B" to the bracket assembly A". The first fastener 30 can be used in conjunction with the support retainer 50 to secure the bracket assembly A" to a support post E", as in FIG. 4. As with the assembly of FIG. 3, the bracket elements 10, 12.

This embodiment provides a strong bracket assembly A" (due to the two nested elements) which proves useful when it is undesirable or unfeasible to secure the bracket assembly A" to an adjacent building foundation and the support post E" needs to be used instead.

As is evident, all the embodiments of the bracket structure utilize as a building block a single L-shaped bracket element 10. In the T-like bracket structure of FIG. 3, the pair of bracket elements 10, 12 are positioned back-to-back whereas in the configuration illustrated in FIG. 5, the two elements contact each other along a portion of their first legs 14 to define a U-shaped member. In the embodiment of FIG. 6, the two elements are nested to form an L-shaped structure. It is evident therefore that a single bracket element can be kept in inventory to produce all of the bracket structures disclosed in FIGS. 3, 5 and 6.

It should be noted that the two L-shaped members could also be secured to each other along their flanges 16 with their first legs 14 extending opposite each other. This type of structure may be useful for certain applications.

Although the invention has been shown and described with reference to a preferred embodiment, it is obvious that modifications and alterations will occur to others upon a reading and understanding of this specification. It is intended to include all such modifications and alterations insofar as they come with the scope of the appended claims or the equivalents thereof.

What is claimed is:

1. A universal bracket assembly for gas risers, comprising:
    a first L-shaped member having a main body portion and a flange extending from one end of said main body portion;
    a second L-shaped member having a main body portion and a flange extending from one end of said main body portion, said two members being secured to each other at least along one of said main body portions and flanges;
    a first aperture provided in each of said flange portions through which a first fastener can extend;
    a second aperture provided in each of said main body portions through which a second fastener can extend;
    at least one weakening line which is provided on each of said main body portions to enable the length of each of said main body portions to be reduced;
    a notch provided at each end of said at least one weakening line; and,
    wherein said first and second members can be secured to each other in several different ways whereby different numbers of gas risers can be supported from various support structures, wherein said two L-shaped members are positioned in a nesting configuration with both their main body portions and their flanges abutting each other.

2. The bracket assembly of claim 1 wherein said second aperture in each of said main body portions is an elongated slot, said second fastener being a U-bolt which enables the bracket structure to support a gas riser.

3. The bracket assembly of claim 1 wherein each of said first apertures in said flanges is of cruciform shape, a first fastener extending through each of said first apertures to enable said bracket structure to be fastened to a support structure.

4. The bracket assembly of claim 1 further comprising a support retainer which is adapted to be inserted between one of said fasteners and an associated gas riser, wherein said support retainer has flat end portions and an indented central portion which is so formed as to enable risers of different diameters to be supported by the assembly.

5. The bracket assembly of claim 1 further comprising an end cap which can be secured over a free end of said two main body portions.

6. The bracket assembly of claim 5 wherein said end cap is substantially rectangular and is adapted to be secured over said main body portions after said main body portions have been reduced in length by cutting along said at least one weakening line, said end cap thereby covering a sharp cut end of each main body portion to prevent injury.

7. The bracket assembly of claim 6 wherein an end piece is adapted to be cut off one of said main body portions and is adapted to be inserted between said main body portions to define an outer end of each of said second apertures, said end piece being substantially rectangular in cross section.

8. A universal bracket assembly for gas risers, comprising:
    a first L-shaped member having a main body portion and a flange extending from one end of said main body portion;
    a second L-shaped member having a main body portion and a flange extending from one end of said main body portion;
    a first aperture provided in each of said flange portions through which a first fastener can extend;
    a U-shaped fastener having threaded end portions, said fastener being adapted to clamp an associated cylindrical object;
    a pair of nuts one being threadable on a respective one of said threaded end portions;
    a second aperture provided in each of said main body portions through which said U-shaped fastener threaded end portions can extend said nuts being threaded on said end portions to secure said main body portions to each other while also clamping said associated cylindrical object;
    a retainer means which is inserted between said U-shaped fastener and an associated gas riser, said retainer means having flat end portions and a central portion which is so formed as to enable gas risers of different diameters to be supported by the assembly; and,
    wherein said first and second members can be secured to each other in three different ways so that said two main body portions contact each other at least along one section whereby both a T-shaped bracket structure and an L-shaped bracket structure can be formed for supporting one associated gas riser and a U-shaped bracket structure can be formed for supporting two associated gas risers, wherein said U-shaped fastener is adapted to be clamped around an associated gas riser, said first fasteners securing the bracket assembly, which is formed into a T-shaped structure, to an associated building wall.

9. A universal bracket assembly for gas risers, comprising:
    a first L-shaped member having a main body portion and a flange extending from one end of said main body portion;
    a second L-shaped member having a main body portion and a flange extending from one end of said main body portion;
    a first aperture provided in each of said flange portions through which a first fastener can extend;

a U-shaped fastener having threaded end portions, said fastener being adapted to clamp an associated cylindrical object;

a pair of nuts one being threadable on a respective one of said threaded end portions;

a second aperture provided in each of said main body portions through which said U-shaped fastener threaded end portions can extend said nuts being threaded on said end portions to secure said main body portions to each other while also clamping said associated cylindrical object;

a retainer means which is inserted between said U-shaped fastener and an associated gas riser, said retainer means having flat end portions and a central portion which is so formed as to enable gas risers of different diameters to be support by the assembly; and, wherein said first and second members can be secured to each other in three different ways so that said two main body portions contact each other at least along one section whereby both a T-shaped bracket structure and an L-shaped bracket structure can be formed for supporting one associated gas riser and a U-shaped bracket structure can be formed for supporting two associated gas risers, wherein said U-shaped fastener is adapted to be clamped around an associated support post, said first fastener also being a U-shaped fastener which is adapted to be clamped around one associated gas riser, the bracket assembly being formed into an L-shaped structure.

10. A universal bracket assembly for gas risers, comprising:

a first L-shaped member having a main body portion and a flange extending from one end of said main body portion;

a second L-shaped member having a main body portion and a flange extending from one end of said main body portion, said two members being secured to each other at least along one of said main body portions and flanges;

a first aperture provided in each of said flange portions through which a first fastener can extend;

a second aperture provided in each of said main body portions through which a second fastener can extend; and, wherein said two L-shaped members are positioned in a nesting configuration with both their main body portions and their flanges abutting each other.

11. The bracket assembly of claim 10 wherein, if desired, said two L-shaped members can be disassembled from their nesting configuration and reassembled so as to have their main body portions abutting each other along their entire length and with their flanges extending opposite each other to define a T-shaped bracket structure.

12. The bracket assembly of claim 10 further comprising:

at least one weakening line which is provided on each of said main body portions to enable the length of each of said main body portions to be reduced; and, a notch provided at each end of said at least one weakening line.

13. The bracket assembly of claim 10 wherein, if desired, said two L-shaped members can be disassembled from their nesting configuration and reassembled so that said flanges are facing each other and said main body portions at least partially overlap and are secured to each other to define a U-shaped bracket structure.

14. The bracket assembly of claim 10 further comprising an end cap which can be secured over a free end of said two main body portions.

15. The bracket assembly of claim 10 further comprising a support retainer which is adapted to be inserted between one of said fasteners and an associated gas riser, wherein said support retainer has flat end portions and an indented central portion which is so formed as to enable risers of different diameters to be supported by the assembly.

* * * * *